(12) United States Patent
Brown

(10) Patent No.: US 8,203,596 B1
(45) Date of Patent: Jun. 19, 2012

(54) PANORAMIC IMAGING SYSTEM WITH DUAL IMAGERS

(75) Inventor: Wade W. Brown, Blaine, MN (US)

(73) Assignee: Lockheed Martin Corporation, Bethesda, MD (US)

( * ) Notice: Subject to any disclaimer, the term of this patent is extended or adjusted under 35 U.S.C. 154(b) by 1215 days.

(21) Appl. No.: 11/961,304

(22) Filed: Dec. 20, 2007

(51) Int. Cl.
*H04N 7/00* (2006.01)
(52) U.S. Cl. ............ 348/36; 348/49; 359/366; 359/462; 359/676; 359/725; 359/726
(58) Field of Classification Search .................... 348/36, 348/49; 359/366, 462, 676, 725–726
See application file for complete search history.

(56) References Cited

U.S. PATENT DOCUMENTS

| | | | |
|---|---|---|---|
| 4,509,837 A * | 4/1985 | Kassies ........................ 353/10 |
| 4,660,978 A * | 4/1987 | Wu ............................... 356/520 |
| 4,917,498 A * | 4/1990 | Geary ........................... 356/513 |
| 5,128,509 A * | 7/1992 | Black et al. ............. 219/121.76 |
| 5,710,661 A * | 1/1998 | Cook ............................ 359/364 |
| 5,721,585 A * | 2/1998 | Keast et al. ..................... 348/36 |
| 6,064,423 A * | 5/2000 | Geng ............................ 348/36 |
| 6,118,474 A * | 9/2000 | Nayar ........................... 348/36 |
| 6,459,451 B2 * | 10/2002 | Driscoll et al. .............. 348/335 |
| 6,639,625 B1 * | 10/2003 | Ishida et al. ................ 348/218.1 |
| 6,909,735 B2 * | 6/2005 | Lizotte et al. ................. 372/109 |
| 7,019,918 B2 | 3/2006 | Wallerstein et al. |
| 7,123,777 B2 | 10/2006 | Rondinelli et al. |
| 7,531,767 B2 * | 5/2009 | Arai et al. ................... 219/121.7 |
| 7,667,829 B2 * | 2/2010 | Kaise et al. ..................... 356/73 |
| 7,933,507 B2 * | 4/2011 | Jelinek et al. .................... 396/18 |
| 7,940,299 B2 * | 5/2011 | Geng ............................ 348/143 |
| 7,995,207 B2 * | 8/2011 | Podoleanu .................... 356/451 |
| 2001/0020976 A1 * | 9/2001 | Peleg et al. ..................... 348/36 |
| 2003/0058506 A1 * | 3/2003 | Green et al. .................. 359/172 |
| 2003/0095186 A1 * | 5/2003 | Aman et al. .................. 348/162 |
| 2003/0160868 A1 * | 8/2003 | Kakou et al. .................. 348/143 |
| 2004/0066561 A1 * | 4/2004 | Nagata et al. ................ 359/676 |
| 2004/0114231 A1 * | 6/2004 | Lo ............................... 359/462 |
| 2004/0200815 A1 * | 10/2004 | Lizotte et al. ............ 219/121.74 |
| 2004/0251243 A1 * | 12/2004 | Lizotte et al. ............ 219/121.73 |
| 2006/0018017 A1 * | 1/2006 | Takahashi .................... 359/466 |
| 2006/0067483 A1 * | 3/2006 | Hack et al. ................... 378/206 |
| 2007/0008534 A1 * | 1/2007 | Lo et al. ....................... 356/401 |
| 2007/0211259 A1 * | 9/2007 | Jeon et al. .................... 356/605 |
| 2007/0229809 A1 * | 10/2007 | Belyaev et al. ............ 356/237.2 |
| 2007/0263113 A1 * | 11/2007 | Baek et al. .................... 348/340 |
| 2008/0180636 A1 * | 7/2008 | Boothroyd ........................ 353/8 |
| 2009/0046360 A1 * | 2/2009 | Funk et al. .................... 359/385 |
| 2009/0166340 A1 * | 7/2009 | Arai et al. ................... 219/121.7 |
| 2010/0045773 A1 * | 2/2010 | Ritchey ........................... 348/36 |
| 2010/0238541 A1 * | 9/2010 | Hauger et al. ................ 359/376 |

\* cited by examiner

*Primary Examiner* — Alina N. Boutah
(74) *Attorney, Agent, or Firm* — Hamre, Schumann, Mueller & Larson, P.C.

(57) ABSTRACT

A panoramic imaging system that uses a second imager, in addition to a full field imager, that provides zoom capabilities with minimal moving parts. The second imager provides the ability to focus on and identify objects of interest that are detected by the full field imager. A steerable beam splitter can be provided to direct images to the full field imager and the zoom imager. The panoramic imaging system can be used in a number of different areas, for example surveillance or reconnaissance systems or in a sense and avoid type of collision avoidance system for aircraft including unmanned aerial vehicles.

11 Claims, 1 Drawing Sheet

PANORAMIC IMAGING SYSTEM WITH DUAL IMAGERS

FIELD

The disclosure relates to a panoramic imaging system, in particular a panoramic imaging system with object detection and identification capability.

BACKGROUND

Panoramic imaging systems, sometimes called omnidirectional vision systems, are known that use an extreme fish eye lens or a catadioptric lens/mirror that provide hemispherical fields of view with a single imager. In the case of catadioptric systems, the image is unwrapped and remapped based on the geometry of the mirror to reconstruct a rectangular image of the hemispherical scene. However, the resulting image tends to have low resolution in areas. Another known panoramic imaging system uses multiple imagers where the individual views from the imagers are "knitted" together to achieve the panoramic view. This imaging system requires a large array of imagers with the added costs resulting from the array of imagers. Another imaging system mounts a pan, tilt and zoom (PTZ) imager on top of the panoramic imaging system, with the PTZ imager providing the ability to zoom in on objects of interest that are detected by the panoramic imaging system. However, a PTZ imager needs a relatively large range of motion as it does not rely on the mirror to provide a reflected image, adds weight and increases reliability issues because of the moving parts.

SUMMARY

A panoramic imaging system that uses a second imager, in addition to a full field imager, that provides zoom capabilities with minimal moving parts. The second imager provides the ability to focus on and identify objects of interest that are detected by the full field imager. A beam splitter can be provided to direct images to the full field imager and the zoom imager. The panoramic imaging system can be used in a number of different areas, for example surveillance or reconnaissance systems or in a sense and avoid type of collision avoidance system for aircraft including unmanned aerial vehicles.

In one exemplary implementation, an imaging system comprises a panoramic device configured to reflect a panoramic image, a steerable beam splitter in an optical path of the reflected image from the panoramic device, a full field imaging device that captures a full field image reflected by the panoramic device, and a zoom imaging device with zoom capability that focuses on an area of interest of the image reflected by the panoramic device. The steerable beam splitter effectively steers the zoom imaging device to allow the zoom imaging device to provide high resolution images of areas of interest.

In still another exemplary implementation, a panoramic imaging system comprises a panoramic mirror configured to reflect an image over a field of view of at least about 180 degrees in a horizontal direction, a steerable beam splitter in an optical path of the reflected image from the panoramic mirror, a full field detection camera for detecting an object in a full field image reflected by the panoramic mirror, and an identification camera with zoom capability for focusing in on a specific area of the panoramic mirror.

In another exemplary implementation, an imaging system comprises a panoramic device configured to reflect an image over a field of view of at least about 180 degrees in a horizontal direction. A full field imaging device captures a full field image reflected by the panoramic device, and a steerable zoom imaging device with zoom capability can focus on an area of interest of the image reflected by the panoramic device.

DRAWINGS

DETAILED DESCRIPTION

Figure 1:
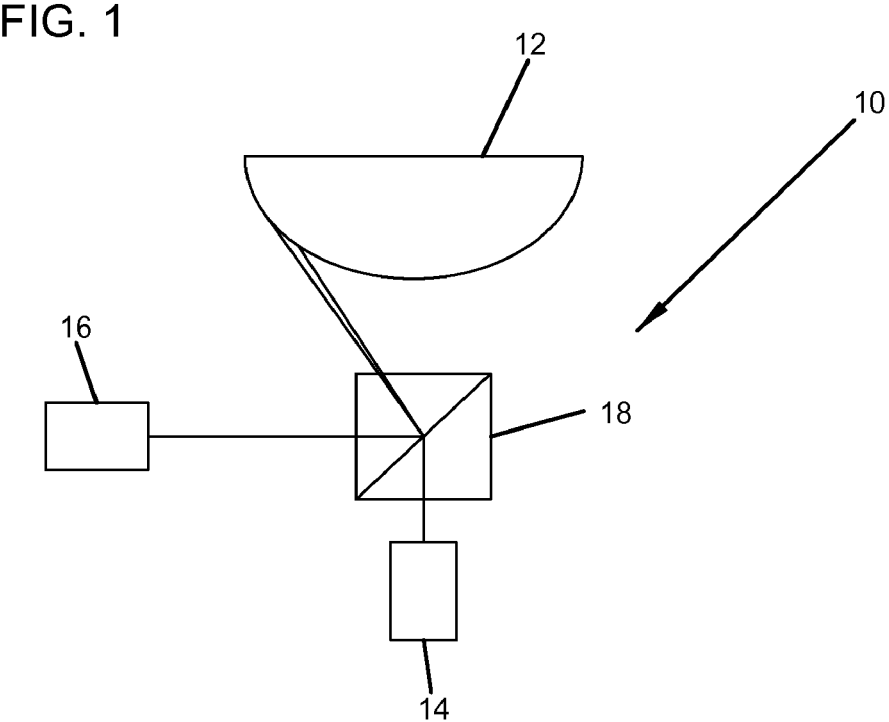
FIG. 1 illustrates an example of a panoramic imaging system according to the concepts described herein.

A panoramic imaging system is described that uses a second imager, in addition to a first, full field imager, that provides zoom capabilities with minimal moving parts. This concept is illustrated in FIG. 1 which illustrates a panoramic imaging system 10 that includes a panoramic device 12, a full field imaging device 14 and a zoom imaging device 16. A steerable beam splitter 18 splits an image from the panoramic device 12 into two optical paths to the imaging devices 14, 16.

The panoramic imaging systems described herein provide images that cover up to 360 degree in the horizontal direction and up to approximately 90 degrees in the vertical direction. The panoramic device 12 can be any device suitable for reflecting a panoramic image. The panoramic device 12 is illustrated as being a hemispherical panoramic mirror. However, any device or shape of device that can reflect a panoramic image can be used. Other examples include, but are not limited to, a hyperboloid, a cone, a sphere or other geometrical shapes that will provide a reflective surface for a panoramic imaging system. In addition, multiple cameras can be used as the panoramic device.

The imaging devices 14, 16 can be any devices suitable for capturing images reflected by the panoramic device 12. One example of a suitable imaging device is a camera, which can be a video camera or a still camera. The imaging devices 14, 16 can be the same type or different types. For example, the imaging device 14 and the imaging device 16 can be video cameras, the imaging device 14 can be a video camera and the imaging device 16 can be a still camera, etc. In addition, the positions of the imaging devices 14, 16 in FIG. 1 can be reversed.

In the example described and illustrated herein, the imaging device 14 is a full field imaging device that captures a full field image from the panoramic device 12. Objects of interest in the full field image of the imaging device can then be detected as is known in the art.

In the example described and illustrated herein, the imaging device 16 is a zoom imaging device having zoom or focus capability allowing the imaging device 16 to focus on a specific region of the image, allowing identification of an object of interest that is detected by the imaging device 14. As an alternative, zoom or focusing optics, for example a focusing lens, can be provided separate from and/or in addition to the imaging device 16 in the optical path between the beam splitter 18 and the imaging device 16.

The beam splitter 18 can be any device that splits the image into two optical paths, one path leading to the imaging device 14 and the second path leading to the imaging device 16. For example, the beam splitter can be a mirror or a pair of glass prisms. The beam splitter 18 is also steerable. This permits the imaging device 16 to focus in on a specific area of the panoramic device 12, for example a location on the left side of the panoramic device as illustrated in FIG. 1, to permit recognition or identification of an object.

It is contemplated that additional optics can be provided in the system 10 if found appropriate to help achieve detection and recognition or identification of an object.

Figure 2:
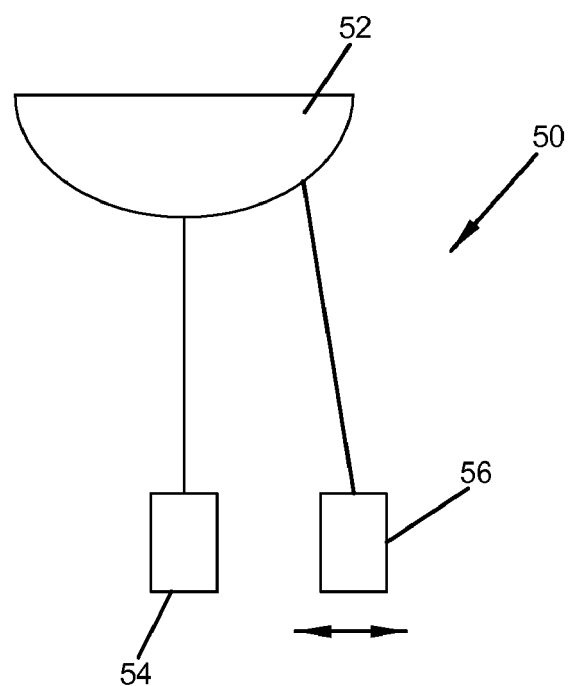
FIG. 2 illustrates another example of a panoramic imaging system according to the concepts described herein.

FIG. 2 illustrates an embodiment of a panoramic imaging system 50 that includes a panoramic device 52, a full field imaging device 54 and a zoom imaging device 56. The system eliminates use of the steerable beam splitter illustrated in FIG. 1. Instead, the zoom imaging device 56 is steerable or movable as indicated by the arrows in FIG. 2. This permits the zoom imaging device 56 to focus in on a specific area of the panoramic device 52 to permit recognition or identification of an object. Moving the zoom imaging device 56 requires less range of motion compared with a PTZ imager mounted on top of an imaging system, because the movable zoom imaging device 56 relies on the panoramic device 52 to receive a reflected image from the device 52.

The embodiments disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. An imaging system, comprising:
 a panoramic device configured to reflect a panoramic image;
 a beam splitter splitting the reflected panoramic image from the panoramic device into first and second optical paths, the beam splitter being steerable;
 a full field imaging device positioned in the first optical path that captures a full field image of the reflected panoramic image from the panoramic device; and
 a zoom imaging device with zoom capability positioned in the second optical path that focuses on and captures an image of an area of interest of the reflected panoramic image from the panoramic device.

2. The imaging system of claim 1, wherein the full field imaging device and the zoom imaging device each comprise a camera.

3. The imaging system of claim 1, wherein the panoramic device comprises a panoramic mirror.

4. The imaging system of claim 3, wherein the panoramic mirror comprises a hemisphere or a hyperboloid.

5. The imaging system of claim 1, wherein the panoramic device reflects the image over a field of view of at least about 180 degrees in a horizontal direction.

6. The imaging system of claim 1, wherein the beam splitter comprises a mirror.

7. A panoramic imaging system, comprising:
 a panoramic mirror configured to reflect an image over a field of view of at least about 180 degrees;
 a beam splitter splitting the reflected image from the panoramic mirror into first and second optical paths, the beam splitter being steerable;
 a full field detection camera positioned in the first optical path for detecting an object in a full field image of the reflected image from the panoramic mirror; and
 an identification camera with zoom capability positioned in the second optical path for focusing in on a specific area of the reflected image from the panoramic mirror.

8. The panoramic imaging system of claim 7, wherein the panoramic mirror comprises a hemisphere or a hyperboloid.

9. The panoramic imaging system of claim 7, wherein the beam splitter comprises a mirror.

10. An imaging system, comprising:
 a panoramic device configured to reflect an image over a field of view of at least about 180 degrees in a horizontal direction;
 a full field imaging device that captures a full field image reflected by the panoramic device in a first optical path; and
 a steerable zoom imaging device with zoom capability that captures an image of an area of interest of the image reflected by the panoramic device in a second optical path.

11. An imaging system, comprising:
 a panoramic device configured to reflect a panoramic image;
 a steerable beam splitter splitting the panoramic image into first and second optical paths;
 a full field imaging device positioned in the first optical path that captures a full field image of the panoramic image; and
 a zoom imaging device with zoom capability positioned in the second optical path that focuses on and captures an image of an area of interest of the panoramic image.

* * * * *